United States Patent
Lopes et al.

(10) Patent No.: US 9,850,103 B2
(45) Date of Patent: Dec. 26, 2017

(54) HOIST CABLE OVERLOAD DETECTION SYSTEMS AND METHODS

(71) Applicant: Goodrich Corporation, Charlotte, NC (US)

(72) Inventors: David R. Lopes, Fullerton, CA (US); Bejan Maghsoodi, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/072,065

(22) Filed: Mar. 16, 2016

(65) Prior Publication Data

US 2017/0267500 A1    Sep. 21, 2017

(51) Int. Cl.
| | |
|---|---|
| G01N 3/00 | (2006.01) |
| B66C 1/40 | (2006.01) |
| B66C 13/16 | (2006.01) |
| G01L 5/04 | (2006.01) |
| G01B 5/30 | (2006.01) |

(52) U.S. Cl.
CPC ........... *B66C 1/40* (2013.01); *B66C 13/16* (2013.01); *G01B 5/30* (2013.01); *G01L 5/04* (2013.01)

(58) Field of Classification Search
CPC .. B66C 1/40; B66C 13/16; G01B 5/30; G01L 5/04
USPC .......................................................... 73/826
See application file for complete search history.

(56) References Cited

U.S. PATENT DOCUMENTS

| | | | | |
|---|---|---|---|---|
| 3,728,502 A | * | 4/1973 | Hawkins | H01H 35/006 |
| | | | | 200/85 R |
| 4,112,750 A | * | 9/1978 | Murakami | B66C 1/40 |
| | | | | 177/147 |
| 4,462,570 A | | 7/1984 | Gagnet | |
| 7,506,907 B1 | * | 3/2009 | Marler | B66C 1/34 |
| | | | | 294/75 |
| 2009/0078505 A1 | * | 3/2009 | Casebolt | A62B 35/0093 |
| | | | | 182/231 |

FOREIGN PATENT DOCUMENTS

| | | |
|---|---|---|
| CN | 201161869 | 12/2008 |
| EP | 2708864 | 3/2014 |
| FR | 1119883 | 6/1956 |

OTHER PUBLICATIONS

EP Search Report dated Aug. 23, 2017 in EP Application 17161305.2.

* cited by examiner

*Primary Examiner* — Max Noori
(74) *Attorney, Agent, or Firm* — Snell & Wilmer L.L.P.

(57) ABSTRACT

A hoist hook assembly having a cable overload detection system may include a plate, a hook mechanically coupled to the plate, and a switch mechanically coupled to the plate. The switch may be configured to translate into a triggered position in response to a load on the hook indicative of an overload condition.

16 Claims, 8 Drawing Sheets

HOIST CABLE OVERLOAD DETECTION SYSTEMS AND METHODS

FIELD

The disclosure relates generally to cable hoists, and more particularly to a rescue hoist hook assembly having a hoist cable overload detection system.

BACKGROUND

Hoists may be used to apply pulling force through a cable or other lifting medium to a load. Hoists may typically have a hook at the end of a line that is attachable to the load. During operation, a hook may occasionally be exposed to loads in excess of the normal operating loads. Excessive tension in the cable and the hook assembly may cause excessive wear to the hoist system. However, current overload detection systems for rescue hoists are limited. In particular, detecting loads and overload conditions experienced at the hook may be difficult and inaccurate as electrical systems at the hook may be exposed to severe environmental conditions, which prevent an electrically based system from operating properly and limited in duration when dependent upon battery power. In many instances, a pilot may simply estimate when a hoist system has been overloaded during operation.

SUMMARY

A hoist hook assembly is provided. The hoist hook assembly may include a plate, a hook mechanically coupled to the plate, and a switch mechanically coupled to the plate. The switch may be configured to translate into a triggered position in response to a load on the hook.

In various embodiments, the switch may include a spring mechanically coupled to the plate and configured to deform in response to the load on the hook, and a pin disposed in the plate configured to translate in response to a deformation of the spring. The spring may comprise a frusto-conical geometry. A groove may be formed in the pin and configured to receive a pin retention head in response to the pin being in the triggered position. A pin retention spring may urge the pin retention head into the groove. The pin may be disposed in the plate and may translate in response to the deformation of the spring over a predetermined distance. The deformation of the spring over the predetermined distance may indicate of an overload condition.

A hoist cable overload detection system is also provided. The cable overload detection system may include a first plate, a spring adjacent the first plate and mechanically coupled to the first plate, a second plate adjacent the spring and oriented with the spring disposed between the first plate and the second plate, and a pin disposed in an opening formed in the first plate. The pin may have an untriggered position and a triggered position and the pin may be configured to translate from the untriggered position into the triggered position in response to a displacement of the first plate relative to the second plate.

In various embodiments, the spring may be, for example, a Belleville spring. The cable overload detection system may also include a pin retention spring disposed in a cavity defined by the first plate and a pin retention head coupled to the pin retention spring. The pin retention head may rest in a first groove formed in the pin in response to the pin being in the untriggered position. The pin retention spring may be configured to compress in response to the pin retention head translating out of the first groove. The pin retention head may also be configured to translate into a second groove formed in the pin in response to the pin translating into the triggered position. A hook may be coupled to the first plate and/or the second plate. The spring may elastically deform in response to a load detected at the hook.

A method of detecting an overload condition on a hoist assembly is also provided. The method comprises setting a switch on a hoist hook assembly to an untriggered position with the switch configured to translate to a triggered position in response to the overload condition. A load is applied to the hoist hook assembly. The method further includes the step of detecting the switch in the triggered position in response to an occurrence of the overload condition.

In various embodiments, the switch may include a pin configured to translate in response to the overload condition. The switch may be translated into the triggered position in response to the load applied to the hoist hook assembly meeting the overload condition. The hoist hook assembly may include one or more Belleville springs. The method may further include translating the switch into the triggered position in response to a deformation of the at least one Belleville spring by a predetermined distance. The method may also include translating the switch into the triggered position in response to a displacement of a first plate of the hoist hook assembly a predetermined distance relative to a second plate of the hoist hook assembly where the first plate is coupled to a first side of a spring and the second plate is coupled to a second side of the spring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Overload detection systems and methods of the present disclosure may detect loads and/or overload conditions at the hook of a hoist. The overload detection systems may include a binary switch located on the hoist hook assembly and having a triggered and untriggered position. The switch may be set to an untriggered position and switched into the triggered position by an overload condition. Once the switch is in the triggered position the switch may be retained in the triggered position until it is reset. Mechanical switches may be used to reduce dependence on electricity and simplify the overload detection systems.

Figure 1:
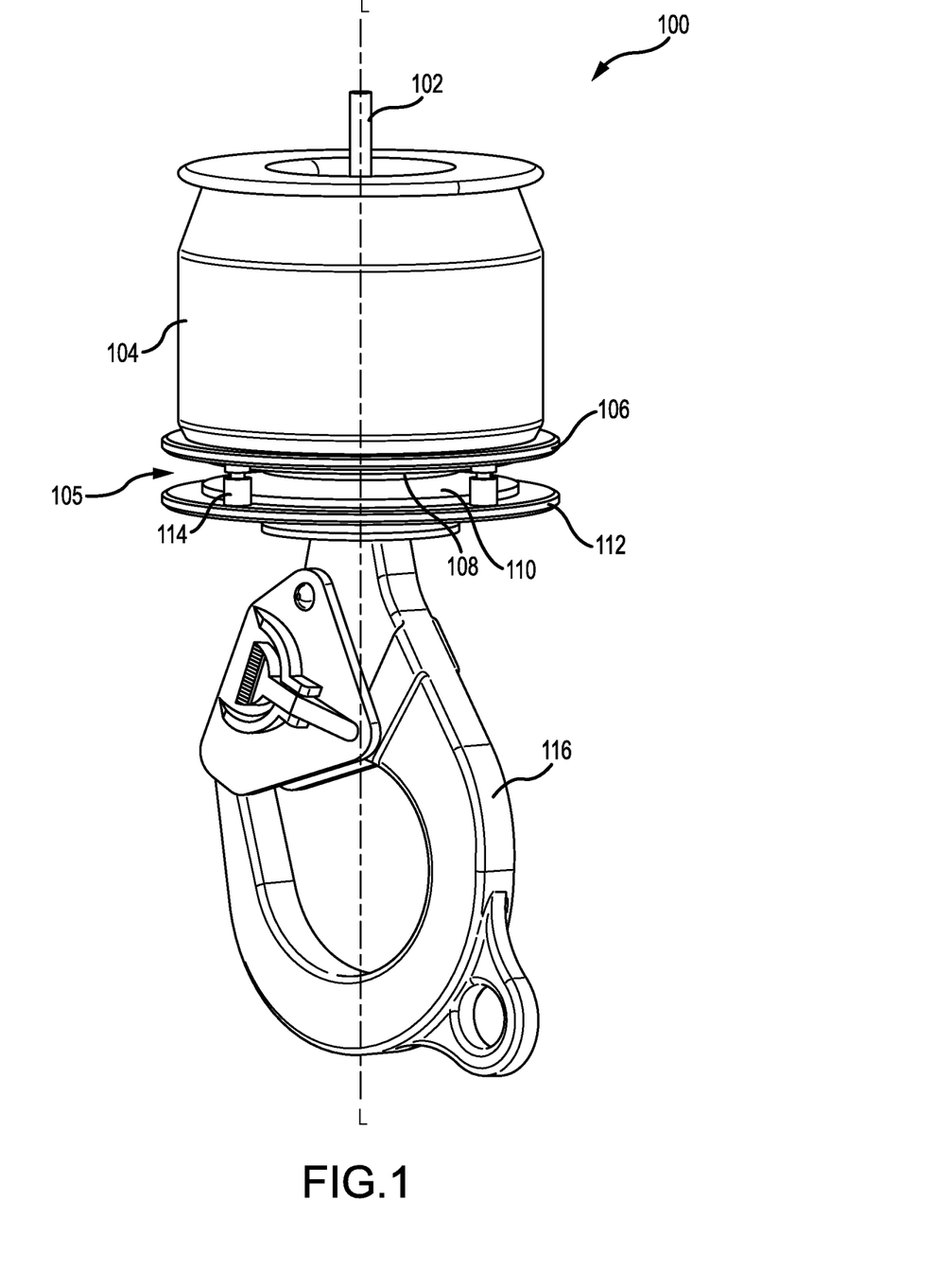
FIG. 1 illustrates hook assembly for a cable hoist system having an overload detection mechanism, in accordance with various embodiments.

Referring now to FIG. 1, an exemplary hoist hook assembly 100 is shown, in accordance with various embodiments. The hoist hook assembly 100 may be coupled to a cable 102. Cable 102 may couple to bumper 104 of hoist hook assembly 100. An overload detection assembly 105 may be mechanically coupled to bumper 104 and hook 116 with the overload detection assembly 105 disposed between hook 116 and cable 102 or bumper 104. In that regard, overload detection assembly 105 may be in the load path from cable 102 to hook 116.

In various embodiments, overload detection assembly 105 may include a plate 106 and a plate 112. Plate 106 may be mechanically coupled to bumper 104 and/or cable 102, and plate 112 may be mechanically coupled to hook 116. A spring mechanism may be disposed between plate 106 and plate 112 and configured to deform in response to a load applied to hook 116. Although many springs may be used, a spring mechanism comprising one or more Belleville springs (also referred to as a Belleville washer) may be used to allow for precise deformation control in response to a predetermined load.

In various embodiments, Belleville spring 108 and Belleville spring 110 may be coupled to plate 106 and plate 112, respectively. The Belleville springs may have a frustoconical geometry and act as a spring, deforming in response to a load present at hook 116. Plate 106 may translate relative to plate 112 along load path L in response to the deformation of the Belleville springs and thus in response to a load present at hook 116. Switches 114 may be configured to translate from an untriggered position to a triggered position in response to the relative translation of plate 106 and plate 112.

Figure 2A:
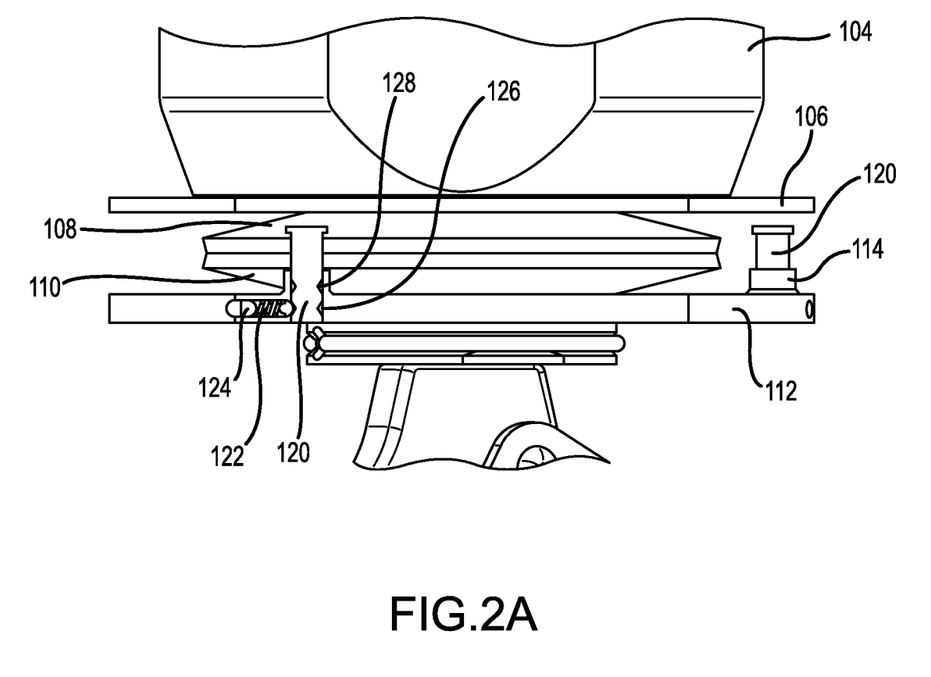
FIG. 2A illustrates an elevation view of a hook assembly for a cable hoist system having an overload detection system that has not triggered, in accordance with various embodiments.
Figure 2B:
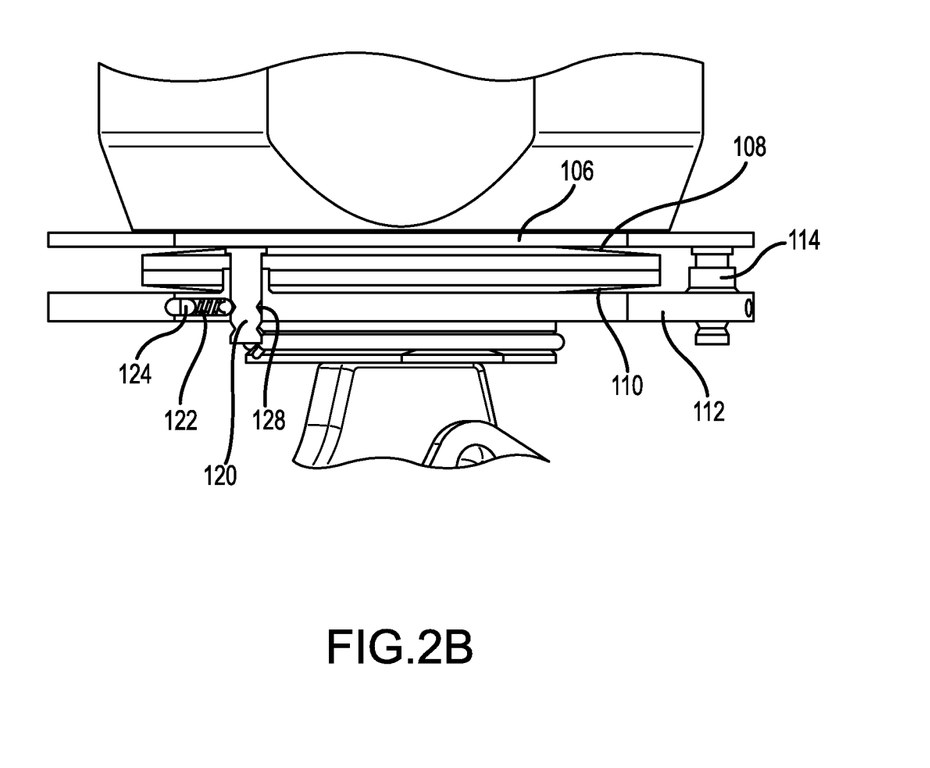
FIG. 2B illustrates an elevation view of a hook assembly for a cable hoist system having an overload detection system at the moment the overload detection system is triggered, in accordance with various embodiments.
Figure 2C:
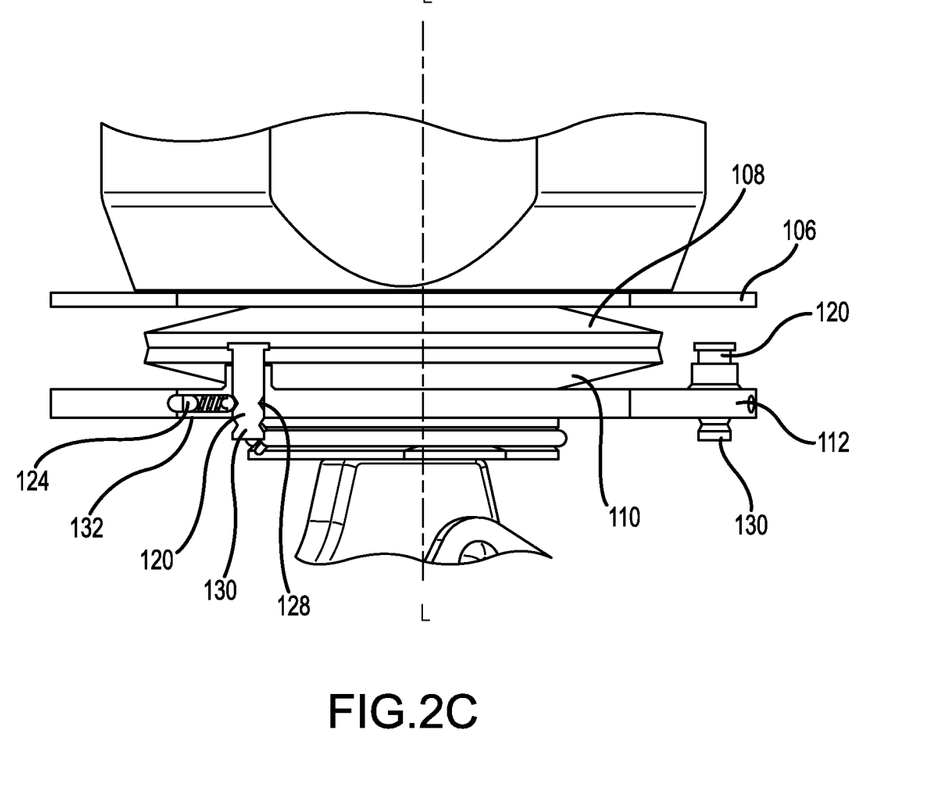
FIG. 2C illustrates an elevation view of a hook assembly for a cable hoist system having an overload detection system that has triggered, in accordance with various embodiments.

With reference to FIGS. 2A, 2B and 2C, hoist hook assembly 100 is shown at various stages of translating the switch 114 in response to an overload condition, in accordance with various embodiments. In FIG. 2A switch 114 is set to an untriggered position. The untriggered position may indicate that no overload condition has been detected at hook 116. Switch 114 may include a pin configured to translate between the untriggered position and a triggered position. In that regard, switch 114 may operate as a binary switch.

In various embodiments, switch 114 may include pin 120. Pin 120 may be retained in an opening defined by plate 112. A groove 126 formed in pin 120 may be configured to engage pin retention device 124. Pin retention device 124 may be disposed in cavity 122 defined by plate 112. Pin retention device 124 may be configured to retain pin 120 in the untriggered state in response to no overload condition being detected. In that regard, pin 120 may be switched into, and retained in, an untriggered position.

Referring now to FIG. 2B, hoist hook assembly 100 is shown with switch 114 transitioning from the untriggered position to the triggered position, in accordance with various embodiments. Plate 106 translates towards plate 112 in response to deformation of Belleville spring 108 and Belleville spring 110. The distance of the deformation may correspond to an overload condition. Pin retention device 124 also translates out groove 126 of pin 120 and/or into groove 128 of pin 120 in response to detecting an overload condition. Pin retention device 124 may retain pin 120 in the triggered position until pin 120 is manually pressed back into the untriggered position.

With reference to FIG. 2C, hoist hook assembly 100 is shown in response to an overload condition occurring and subsiding, in accordance with various embodiments. Belleville spring 108 and Belleville spring 110 may have shifted position in response to the overload condition of FIG. 2B subsiding. As no overload condition is present in FIG. 2C, the Belleville springs exhibit less deformation than in FIG. 2B. Plate 106 may translate relative to plate 112 along the load path L with plate 106 moving away from switch 114 and pin 120. However, switch 114 and pin 120 are retained in the triggered state with a portion 130 of pin 120 protruding from hook-side surface 132 of plate 112 to allow visual detection that an overload condition occurred. Switch 114 may remain in the triggered state until switch 114 is manually reset into the untriggered state (e.g., by pressing portion 130 of pin 120 into plate 112). Although switch 114 is illustrated as a pin-based switch in FIGS. 2A to 2C, other switch types may also be implemented to detect an overload condition.

Figure 3A:
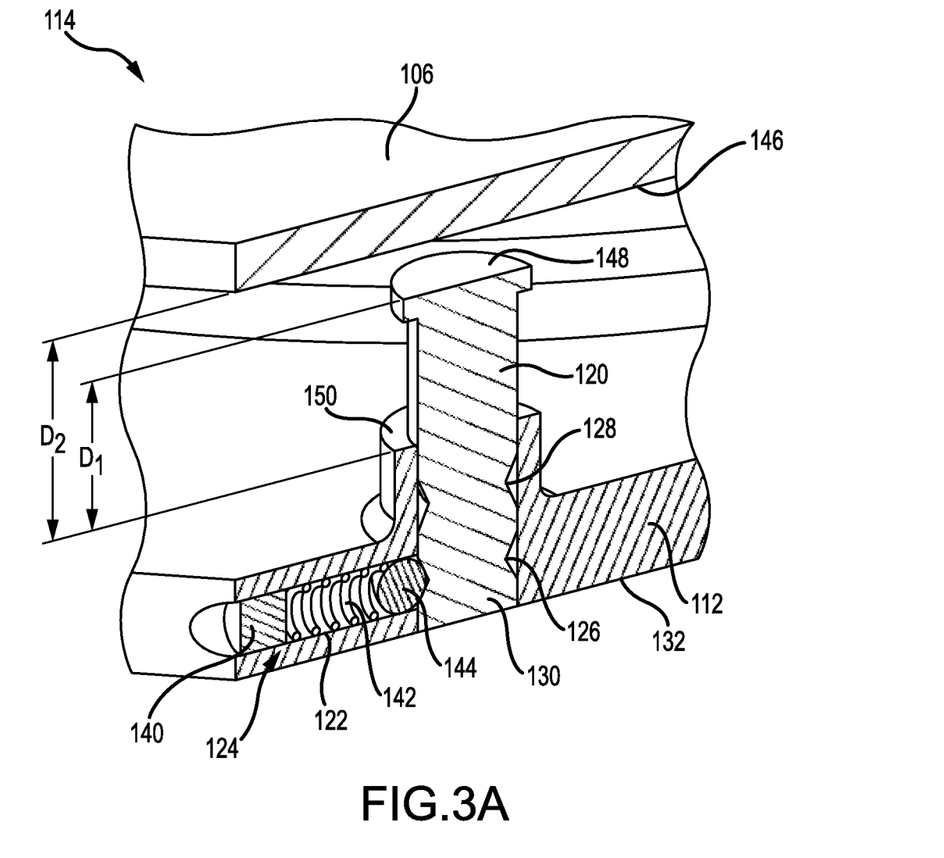
FIG. 3A illustrates a cross-sectional perspective view of an overload detection system for a hook assembly that has not triggered, in accordance with various embodiments.

Referring now to FIGS. 3A to 3D, the operation of switch 114 is illustrated in response to an overload condition, in accordance with various embodiments. In FIG. 3A, switch 114 is in an untriggered position. Pin retention device 124 includes press fit plug 140 providing support for pin retention spring 142 to press pin retention head 144 into groove 126 formed in pin 120. Pin may be retained in sleeve 150 formed in plate 112. The distance $D_1$ between an surface 148 of pin 120 and sleeve 150 of plate 112 may be less than the distance $D_2$ between hook-side surface 146 of plate 106 and sleeve 150 of pin 120. Thus, a gap is formed between pin 120 and plate 106 in response to pin 120 being in an untriggered position.

Figure 3B:
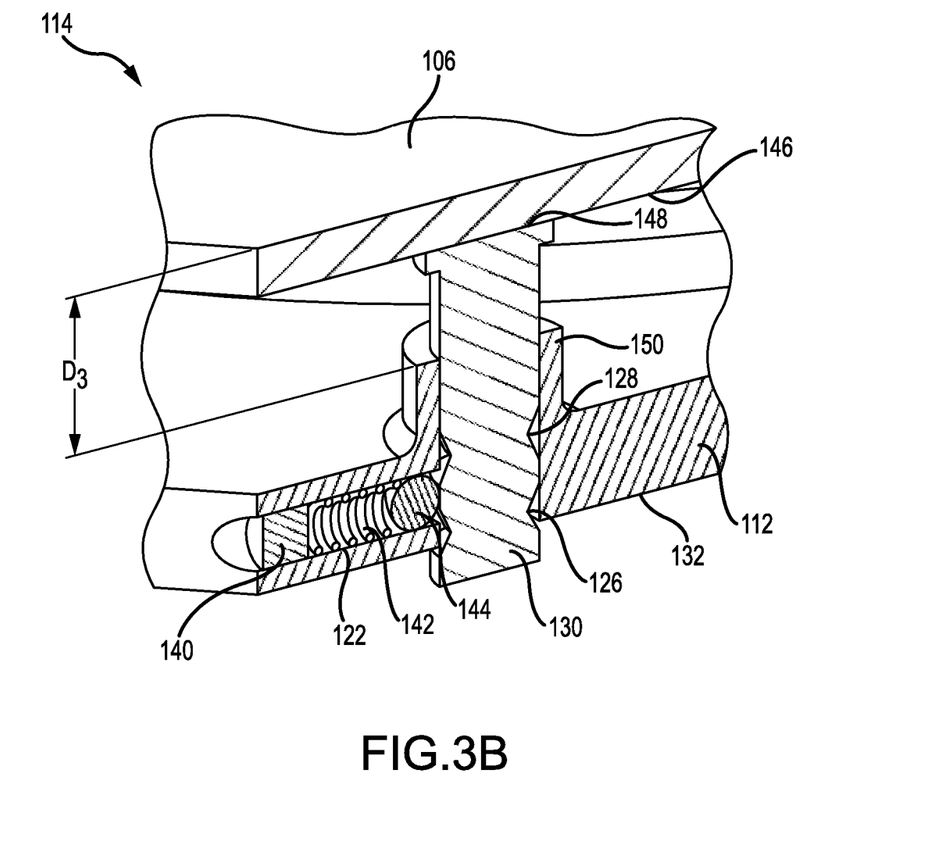
FIG. 3B illustrates a cross-sectional perspective view of an overload detection system for a hook assembly experiencing a loading event, in accordance with various embodiments.

With reference to FIG. 3B, switch 114 is illustrated with hoist hook assembly 100 in a loaded position that is short of an overloaded position, in accordance with various embodiments. Plate 106 is translated relative to plate 112 to reduce the distance between the plates. The distance $D_3$ between hook-side surface 146 of plate 106 and sleeve 150 of plate 112 is the same as the distance $D_3$ between sleeve 150 and surface 148 of pin 120. In that regard, plate 106 may press pin 120 into sleeve 150. Pin retention spring 142 may compress in response to a force applied by plate 106 to pin 120 and thereby allow pin retention head 144 to retreat from groove 126. Switch 114 may not be pressed completely into the triggered position. Switch 114 may be configured to return to the untriggered position depicted in FIG. 3A in response to plate 106 translating to a distance greater than distance $D_1$ from sleeve 150. In that regard, switch 114 may be spring loaded to return to the untriggered position in response to being dislodged from the untriggered position but not urged into the triggered position.

Figure 3C:
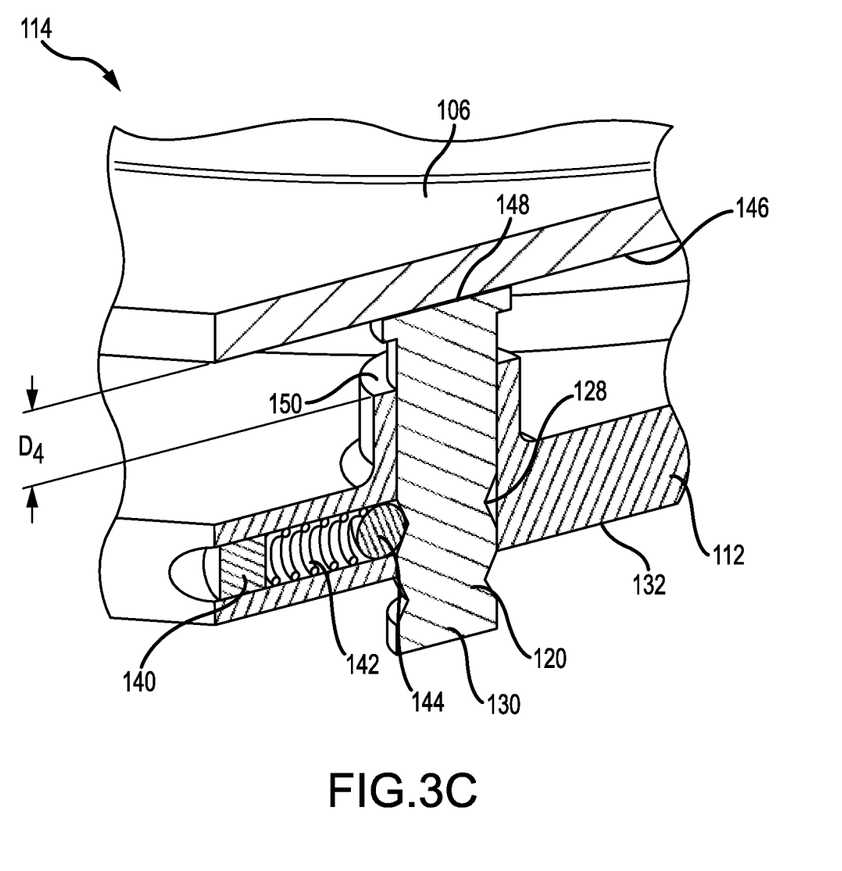
FIG. 3C illustrates a cross-sectional perspective view of an overload detection system for a hook assembly that during an overload event, in accordance with various embodiments.

With reference to FIG. 3C, switch 114 is illustrated being urged into the triggered position by plate 106 in response to an overload condition, in accordance with various embodiments. The distance between hook-side surface 146 of plate 106 and sleeve 150 of plate 112 may be distance $D_4$. Distance $D_4$ may also separate surface 148 of pin 120 from sleeve 150 of plate 112. Plate 106 may drive pin 120 into sleeve 150 so that portion 130 of pin 120 protrudes from hook-side surface 132 of plate 112. Pin retention device 124 may retain pin 120 in the switched position with pin retention spring 142 expending and translating pin retention head 144 into groove 128 formed in pin 120.

Referring briefly to FIGS. 2A-2C, the distance that plate 106 travels in pushing pin 120 into the triggered position may be predetermined based on the displacement of the spring mechanisms (e.g., Belleville spring 108 and Belleville spring 110) and the force corresponding to the displacement. Thus, plate 106 may translate to distance $D_4$ from sleeve 150 in response to the spring mechanism coupled to the plate also displacing a distance $D_4$. The deformation of a spring by distance $D_4$ may correspond to a load on hoist hook assembly 100 at which an overload condition is detected.

Figure 3D:
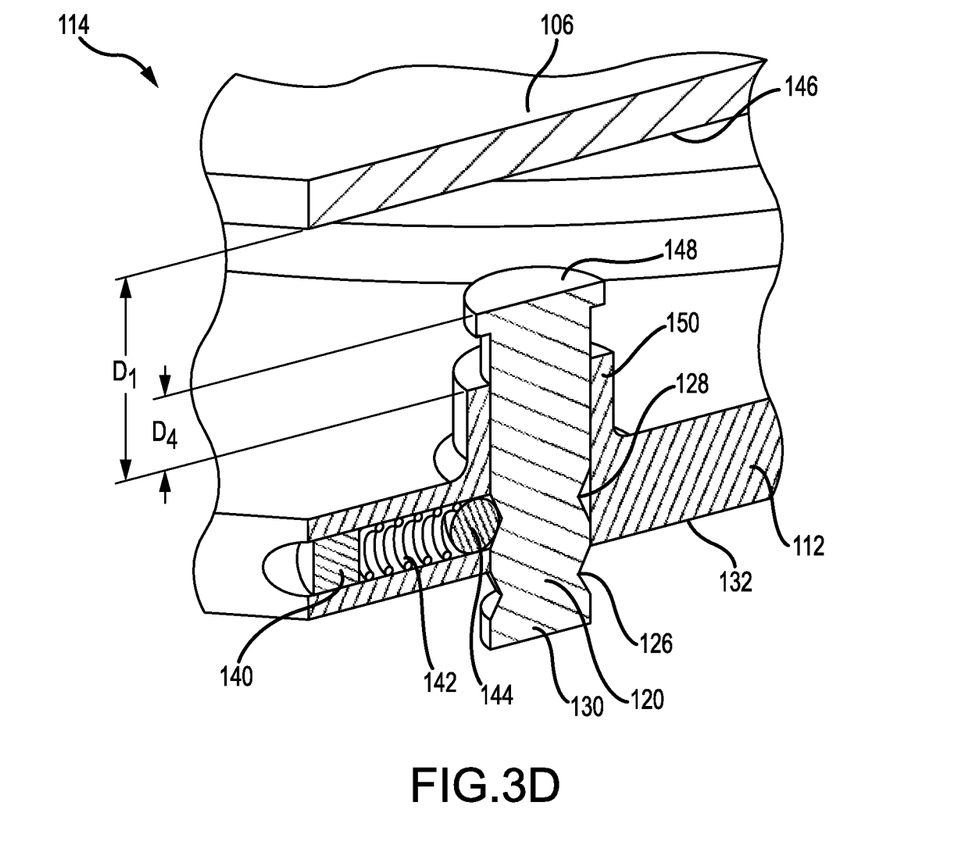
FIG. 3D illustrates a cross-sectional perspective view of an overload detection system for a hook assembly that has triggered in response to an overload event, in accordance with various embodiments.

Referring now to FIG. 3D, switch 114 is shown in a triggered position in response to hoist hook assembly 100 in a non-overloaded condition following detection of an overloaded condition, in accordance with various embodiments. Surface 148 of pin 120 may be retained at distance $D_4$ from sleeve 150. Plate 106 may return to distance D1, distance $D_2$, or another distance greater than $D_4$ from sleeve 150. In that regard, a gap is formed between surface 148 of pin and hook-side surface 146 of plate 106. A portion 130 of pin 120 may protrude from hook-side surface 132 of plate 112 in response to switch 114 being in the triggered position. Switch 114 may be retained in the triggered position until switch 114 is intentionally reset to the untriggered position. Switch 114 may thus detect an overload condition on hoist hook assembly 100 and the switch may be reset after the overload condition is signaled by, for example, visual detection.

Hoist hook assemblies and overload detection systems of the present disclosure may enable detection of overload conditions at remote times. The overload conditions are also detected at the hook end of a hoist. For example, a helicopter rescue hook at the end of a cable may bounce off the hull of a ship, causing an overload condition. The hook assembly may be examined after landing to determine whether an overload detection switch is triggered. If so, the overload has been successfully detected after it occurred.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:
1. A hoist hook assembly, comprising:
a first plate;
a hook mechanically coupled to the first plate;

a second plate spaced a distance from and mechanically coupled to the first plate by a spring; and a switch mechanically coupled to the plate and configured to translate into a triggered position in response to a predetermined load on the hook, wherein the switch comprises:

a pin disposed in an opening formed in the first plate with the pin having an untriggered position and a triggered position, wherein the pin is configured to translate from the untriggered position into the triggered position in response to a displacement of the first plate relative to the second plate;

a pin retention spring disposed in a cavity defined by the first plate; and a pin retention head coupled to the pin retention spring and configured to rest in a first groove formed in the pin in response to the pin being in the untriggered position.

2. The hoist hook assembly of claim 1, wherein the spring comprises a frusto-conical geometry.

3. The hoist hook assembly of claim 2, further comprising a second groove formed in the pin and configured to receive a pin retention head in response to the pin being in the triggered position.

4. The hoist hook assembly of claim 3, wherein the pin retention spring is configured to urge the pin retention head into the first groove or the second groove.

5. The hoist hook assembly of claim 2, wherein the pin disposed in the plate is configured to translate in response to the deformation of the spring over a predetermined distance.

6. The hoist hook assembly of claim 5, wherein the deformation of the spring over the predetermined distance is indicative of an overload condition.

7. A hoist cable overload detection system, comprising:
a first plate;
a spring mechanically coupled to the first plate;
a second plate mechanically coupled to the spring and oriented with the spring between the first plate and the second plate;
a pin disposed in an opening formed in the first plate with the pin having an untriggered position and a triggered position, wherein the pin is configured to translate from the untriggered position into the triggered position in response to a displacement of the first plate relative to the second plate;
a pin retention spring disposed in a cavity defined by the first plate; and
a pin retention head coupled to the pin retention spring and configured to rest in a first groove formed in the pin in response to the pin being in the untriggered position.

8. The hoist cable overload detection system of claim 7, wherein the pin retention spring is configured to compress in response to the pin retention head translating out of the first groove.

9. The hoist cable overload detection system of claim 7, wherein the pin retention head is configured to translate into a second groove formed in the pin in response to the pin translating into the triggered position.

10. The hoist cable overload detection system of claim 7, further comprising a hook mechanically coupled to at least one of the first plate or the second plate.

11. The hoist cable overload detection system of claim 10, wherein the spring is configured to elastically deform in response to a load detected at the hook.

12. A method of detecting an overload condition on a hoist assembly, comprising:
setting a switch on a hoist hook assembly to an untriggered position with the switch configured to translate to a triggered position in response to the overload condition;
applying a load to the hoist hook assembly; and
detecting the switch in the triggered position in response to an occurrence of the overload condition,
wherein the hoist assembly comprises:
a first plate;
a spring mechanically coupled to the first plate;
a second plate mechanically coupled to the spring and oriented with the spring between the first plate and the second plate;
a pin disposed in an opening formed in the first plate with the pin having an untriggered position and a triggered position, wherein the pin is configured to translate from the untriggered position into the triggered position in response to a displacement of the first plate relative to the second plate;
a pin retention spring disposed in a cavity defined by the first plate; and
a pin retention head coupled to the pin retention spring and configured to rest in a first groove formed in the pin in response to the pin being in the untriggered position.

13. The method of claim 12, further comprising translating the switch into the triggered position in response to the load applied to the hoist hook assembly meeting the overload condition.

14. The method of claim 12, wherein the hoist hook assembly comprises at least one Belleville spring.

15. The method of claim 14, further comprising translating the switch into the triggered position in response to a deformation of the at least one Belleville spring by a predetermined distance.

16. The method of claim 12, further comprising translating the switch into the triggered position in response to a displacement of a first plate of the hoist hook assembly a predetermined distance relative to a second plate of the hoist hook assembly, wherein the first plate is coupled to a first side of a spring and the second plate is coupled to a second side of the spring.

* * * * *